(12) United States Patent  
Oliver et al.

(10) Patent No.: US 8,037,050 B2  
(45) Date of Patent: Oct. 11, 2011

(54) METHODS AND APPARATUS FOR PERFORMING MULTI-DATA-SOURCE, NON-ETL QUERIES AND ENTITY RESOLUTION

(75) Inventors: William Oliver, Tuscon, AZ (US); Robert Griffin, Tuscon, AZ (US)

(73) Assignee: Knowledge Computing Corporation, Tuscon, AZ (US)

( * ) Notice: Subject to any disclaimer, the term of this patent is extended or adjusted under 35 U.S.C. 154(b) by 276 days.

(21) Appl. No.: 12/361,738

(22) Filed: Jan. 29, 2009

(65) Prior Publication Data

US 2010/0030750 A1 Feb. 4, 2010

Related U.S. Application Data

(60) Provisional application No. 61/085,829, filed on Aug. 2, 2008.

(51) Int. Cl.  
*G06F 17/30* (2006.01)

(52) U.S. Cl. ........ 707/706; 707/708; 707/713; 707/715; 707/758

(58) Field of Classification Search .................. 707/706, 707/747, 748–758  
See application file for complete search history.

(56) References Cited

U.S. PATENT DOCUMENTS

| | | |
|---|---|---|
| 5,864,851 A | 1/1999 | Breitbart et al. |
| 6,912,549 B2 | 6/2005 | Rotter et al. |
| 7,356,549 B1 * | 4/2008 | Bruso et al. .................. 707/696 |
| 2003/0195877 A1 * | 10/2003 | Ford et al. ........................ 707/3 |
| 2005/0080821 A1 | 4/2005 | Breil et al. |
| 2005/0147947 A1 * | 7/2005 | Cookson et al. .............. 434/154 |
| 2005/0172010 A1 * | 8/2005 | Malone et al. ................ 709/219 |
| 2005/0222989 A1 * | 10/2005 | Haveliwala et al. ............. 707/3 |
| 2006/0031268 A1 | 2/2006 | Shutt et al. |
| 2006/0195461 A1 * | 8/2006 | Lo et al. ......................... 707/100 |
| 2006/0242205 A1 | 10/2006 | Schmidt et al. |
| 2007/0214018 A1 * | 9/2007 | Claud ............................... 705/3 |
| 2009/0172047 A1 | 7/2009 | Boyko et al. |
| 2009/0177647 A1 | 7/2009 | Oliver et al. |
| 2009/0307184 A1 * | 12/2009 | Inouye et al. ..................... 707/2 |

OTHER PUBLICATIONS

Heather Mccallum-Bayliss, Identity Resolution in a Global Environment: Fishing for People in a Sea of Names, 2004 IEEE, pp. 21-26.  
Hector Garcia-Molina, Entity Resolution: Overview and Challenges, 2004, pp. 1-2.  
Hector Garcia-Molina, Pair-wise entity resolution: Overview and challenges, 2006 ACM, p. 1.  
Lu et al, Query evaluation and optimization in deductive and object-oriented spatial databases, 1995IST, pp. 131-143.  
Kaczmarski et al., "Beyond Backup Toward Storage Management," IBM Systems Journal, vol. 42, No. 2, 2003, pp. 322-337.

* cited by examiner

*Primary Examiner* — Hanh Thai  
(74) *Attorney, Agent, or Firm* — Oppedahl Patent Law Firm LLC

(57) ABSTRACT

The application discloses a new system for performing queries and entity resolution on two or more data sources without having to ETL all the documents, entities, and descriptions of entities. Also disclosed, is a method to perform advanced entity resolution without divulging personally sensitive information to end-users and intermediate systems.

10 Claims, 2 Drawing Sheets

METHODS AND APPARATUS FOR PERFORMING MULTI-DATA-SOURCE, NON-ETL QUERIES AND ENTITY RESOLUTION

CROSS-REFERENCE TO RELATED APPLICATIONS

This application claims priority from U.S. application No. 61/085,829, filed Aug. 2, 2008, which application is incorporated herein by reference for all purposes.

BACKGROUND OF THE INVENTION

Users who are searching for data contained in physically or logically separate data sources (such as databases, flat-files, xml, etc.) typically must issue physically separate queries to each database or warehouse where they are interested in finding data. Additionally, the results which are returned from these separate queries are not correlated, consolidated, nor de-conflicted. Therefore, the user must attempt to determine which pieces of information relate to each other and refer to the same real-world object. This would typically be done either in the user's head or with the use of another application, such as Microsoft Excel, Microsoft Word, etc., which requires significant manual work to be done. This can result in incorrect and tiring work, as well as not being readily repeatable. If the number of returns is significant, the user may not even choose to perform this manual process since the amount of information to process is too much for a human to correlate. Moreover, the require information correlation would take simply too much time to do by hand or with tools that were never intended to do such work.

Query Brokers, Federated Queries, and Distributed Queries are not new concepts. The problem is that none of these give a comprehensive view of an entity's history, since none attempt to correlate entities across different data sources. The trick is to correlate entities across the disparate systems in a domain-meaningful way, as well as be able to query additional information from those systems and correlate associations across those systems without permanently storing data either on the user's workstation or on a centralized server. Typically, Query Brokers and other distributed designs return a list of matches to a user's query, but do not even attempt to determine if pieces of information from different systems actually relate to the same real-world object because of the difficulty or potential for incorrect correlations to occur. This work is left up to the user to do "in their head".

There are two ways to solve the problem. First, is a brute-force approach wherein all relevant data pieces are copied from source systems to the destination system and then performing consolidation or de-duplication on the destination system after all pieces of information have been copied. This will in theory work; however, computers, networks, disk drives, etc. may all be too slow for this to be practically achievable for large sets of data. Also, data could be stored in a warehouse, but not all source systems lend themselves to be replicated into a central warehouse, and the storage requirements for such a system may be extremely large.

BRIEF SUMMARY OF THE INVENTION

This patent application discloses a new system for performing queries and entity resolution on two or more data sources without having to ETL all the documents, entities, and descriptions of entities. Also disclosed, is a method to perform advanced entity resolution without divulging personally sensitive information to end-users and intermediate systems.

Briefly, a user initiates a query across disparate systems for information relating to an entity. Once all results are returned to the originating server, the result sets are combined in-memory (computer RAM). It does not have to be in volatile memory, but if there is enough RAM on the system this is the fastest approach. Then a process loops through the consolidation strings and determines if two rows should consolidate. When a consolidation occurs, the rows are combined and the row values and consolidation strings are combined to reflect this new entity. In this way, the system is combining information from different systems and increasing our understanding of the objects involved, unlike in the present art.

The primary key of the row is now concatenated with both rows' primary keys. It is important to note that the consolidation strings may include description information that is or is not returned in that query. For example, a consolidation string may contain a Social Security Number (SSN) or an FBI number, but the actual DESCRIPTION information in the original row does not contain such information and is not visible to the intermediary systems or the end user. What this is essentially doing is returning a compacted list of all the ways an object can be combined with another object. Notably, consolidation strings can be encrypted or hashed, so as to protect the personal information not intended for end users to see, such as SSNs or Driver License numbers. In other words, this query could be formulated to return a name only, but the consolidation of the entities will be based on all knowledge of the entity across all queried systems. Each row of the combined results is assigned a primary key that is a parsible concatenation of each primary key that contributed to the information in a given results row.

Once the computer system application receives this new result and additional information or further action is requested on this consolidated row, the new concatenated primary key is sent back to the originating server. The server parses through the primary key, and automatically issues new parallel queries to each site specified in the concatenated primary key list. Those results then go through the same consolidation process as described above and the cyclic process keeps the real-world entity data view consistent from the first query on.

DETAILED DESCRIPTION

First Embodiment

Fine-Tuning Entity Query Results Using Consolidated Strings

This embodiment of the present invention uses a combination of Consolidation Strings, special key identifiers, and special system parsing and query methodologies in conjunction with multiple computing systems that house entity data. Please see the consolidation string discussion in the patent application Method and Apparatus for Conducting Data Queries Using Consolidation Strings and Inter-Node Consolidation (U.S. patent application Ser. No. 12/139,152), which is incorporated herein in its entirety for all purposes. However, it is important to note that the present invention does not require use of the Consolidation Strings methodology, but instead could use any rules-based entity-resolution algorithm so long as the entity-resolution algorithm's parts can be condensed into a list of characters that can be transmitted. That being the case, for ease of discussion, the use of the term "consolidation string" in this specification and claims is intended to also encompass alternative entity-resolution identification information schemes. Basically, a consolidation string is a representation of identifying information for the entity. Consolidation strings are prioritized on hierarchical set of rules, which allow for the consolidation or un-consolidation of entities based on the matching or non-matching of the consolidation strings. Additionally, consolidation strings can be encrypted or hashed to secure the privacy of the information.

Figure 1:
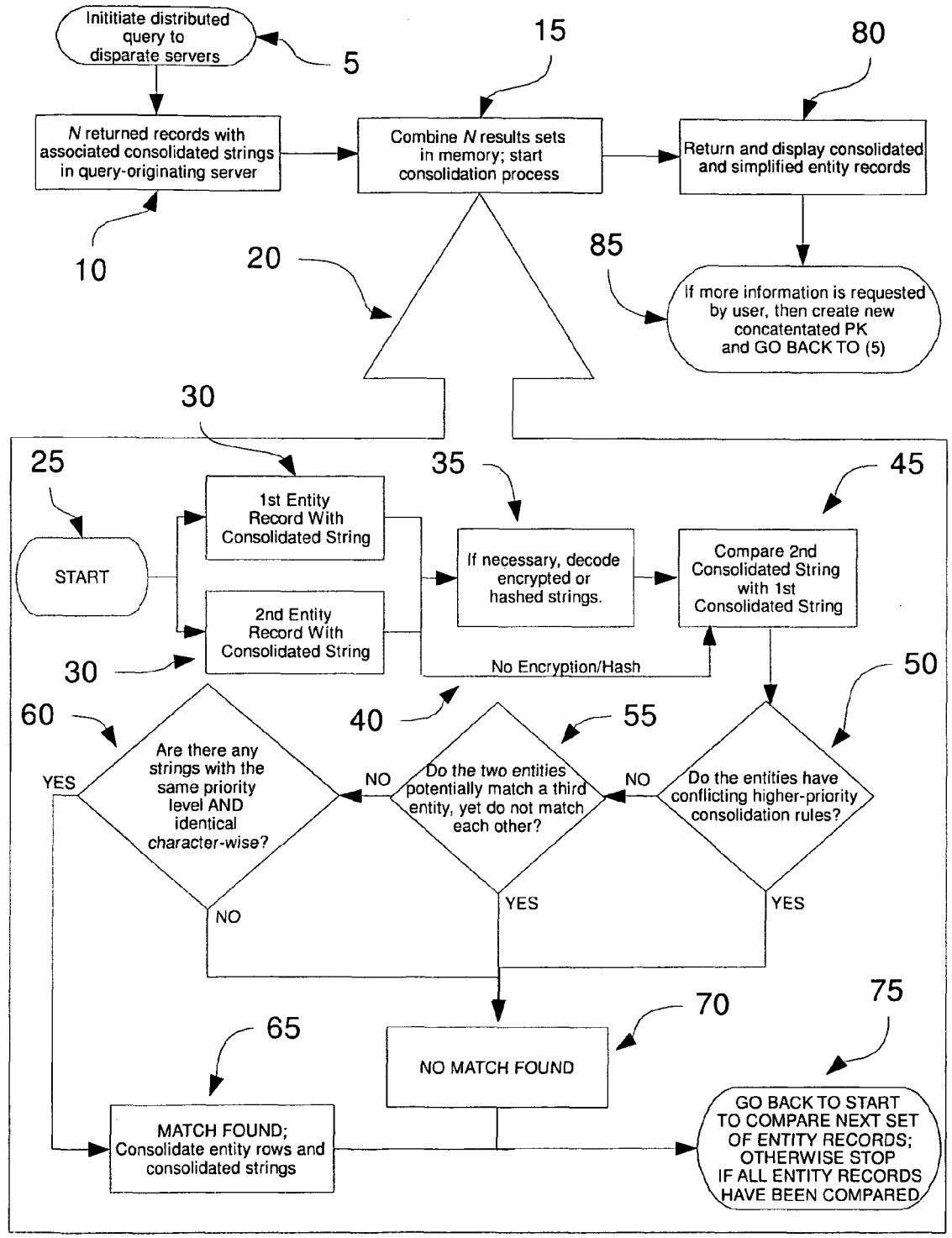
FIG. 1 depicts one embodiment of the overall on-the-fly entity record consolidation system and method using consolidation strings as one example of a rules-based entity-resolution algorithm that could be used to facilitate the present invention.

Refer to FIG. 1. When a distributed query (FIG. 1: 5) is run on a disparate system, certain columns for display are returned, such as name, height, weight, etc. However, in order to do an on-the-fly consolidation, it is necessary to also return a column that lists all of the consolidation strings for each row returned (FIG. 1: 10). The column can contain all the concatenated consolidation priority levels and consolidation strings for that entity, using the following structure:

LEVEL!CONSSTR|LEVEL!CONSSTR| . . .

where the level of the consolidation string (hierarchical rule priority level) is separated from its consolidation string by an exclamation symbol (!), and different level-consolidation-string groups are separated by a pipe (|) symbol. In this way, a text parser can parse through and unambiguously determine which strings and priority levels go together with which entities.

Once all results are returned to the originating server, the result sets are combined in-memory (computer RAM) (FIG. 1: 15). It does not have to be in volatile memory, but if there is enough RAM on the system this is the fastest approach. Then a process (FIG. 1: 20) loops through the consolidation strings and determines if two rows should consolidate. When a consolidation occurs, the rows are combined and the row values and consolidation strings are combined to reflect this new entity (FIG. 1: 65). In this way, the system is combining information from different systems and increasing our understanding of the objects involved. It is possible that more entities will consolidate with information obtained from other sources when more data sources are included in the search. It is also possible that entities will keep from consolidating because of information obtained from more data sources (differentiating characteristics).

The primary key (PK) of the row is now concatenated with both rows' primary keys. It is important to note that the consolidation strings may include description information that is or is not returned in that query. For example, a consolidation string may contain a Social Security Number (SSN) or an FBI number, but the actual DESCRIPTION information in the original row does not contain such information and is not visible to the intermediary systems or the end user. What this is essentially doing is returning a compacted list of all the ways an object can be combined with another object. Notably, consolidation strings can be encrypted or hashed (see FIG. 1: 40), so as to protect the personal information not intended for end users to see, such as SSNs or Driver License numbers. In other words, this query could be formulated to return a name only, but the consolidation of the entities will be based on all knowledge of the entity across all queried systems.

Here is an example of rows from separate systems:
Tucson Database Result:

| PERSONPK1 | NAME1 | DESCRIPTION1 | CONSSTR1, CONSSTR2 |

Phoenix Database Result:

| PERSONPK2 | NAME2 | DESCRIPTION2 | CONSSTR1, CONSSTR3 |

New Single Combined Row After Consolidation Based on CONSSTR1:

| TUCSON:PERSONPK1\| PHOENIX:PERSONPK2 | NAME1 (alias: NAME2) | DESCRIPTION1 (DESCRIPTION2) | CONSSTR1, TUCSON, CONSSTR2, PHOENIX CONSSTR3 |

The Primary Key (PK) for the combined row is formed as a concatenation of the site name from where it came, plus the originating primary key, plus all primary key site name and values with which it consolidates. A colon (":") is used to separate the site name from the originating PK value. A pipe ("|") symbol is used to separate different sites from each other. In this manner, the new PK can be parsed out to determine where it came from. So an example consolidated primary key may look like:

TUCSON:123|PHOENIX:4567|PHOENIX:12345

This means that this new consolidated view of the entity consists of three records from underlying source systems, one from the TUCSON node (PK 123), and two from the PHOENIX node (PKS of 4567 and 12345). Please note that there may be any number of primary keys listed here from any combination of sites. There does not have to be one from each site, neither is it limited to one per site.

In these examples, the DESCRIPTION column represents a set of attributes on the object. For person, it would be height range, weight range, eye color, hair color, image pointers, etc.

Once the computer system application receives this new result and additional information or further action is requested on this consolidated row, the new concatenated primary key is sent back to the originating server (FIG. 1: 85). The server parses through the primary key (using the pipes and colons as explained earlier), and automatically issues new parallel queries to each site specified in the concatenated primary key list. Those results then go through the same consolidation process as described above and the cyclic process keeps the real-world entity data view consistent from the first query on.

Example: Resolving Consolidated Person Records

To apply the principles described above, consider the consolidation of a person record derived from two sources:

The Person primary keys are concatenated as described above.

The local Person name is set to the 'true' name and all others are moved to Alias names, possibly in a separate column.

The Person height and weight ranges are compared and, if differing values are detected, the different values are concatenated and the application knows how to show the different values to an end user, perhaps displayed as a set of height and weight ranges.

The Person eye color and hair color, if differing values, are concatenated and the application knows how to show both values to an end-user.

The Person image (mug shots, tattoos, etc) pointers are combined in a fashion similar to that used to combine primary keys: The site name is prefixed to the actual value using a colon ':' and values are separated by pipes '|'.

The counts of documents in the system are added together using an integer sum operation. Care must be taken that the system does not sum the alias document counts, as that would report an exaggerated number of contacts.

A new column is added which specifies the site name where the two rows came from.

Also, this example consolidation could be performed on a remote server, before being sent to the User interface from where the original query request originates. Alternatively, if the User interface is powerful enough, the separate results could be sent to the User interface and it could combine the results. In fact, a button could exist which would allow the user to consolidate or unconsolidate (that is, separate the consolidated records) on-the-fly.

Finding Associations Across Different Systems

One of the benefits to amassing data into a centralized warehouse is the ability to perform analytics and data mining with relative ease and speed. However, as explained above, not all data can be copied into a warehouse. Using the present embodiment, a user can find associations of these newly correlated (consolidated) entities across any number of disparate data systems. An association is a related entity that has either appeared in the same document or has a special (forced) relationship to another entity. The benefit to using the present invention is that a user can get all associations of all similar entities, whereas in traditional federated queries, a user can only get additional associations of one of the entities in the list. This benefit is typically accomplished as follows:

1. The user initiates a consolidated entity search across the data sources of interest.
2. The system returns a list of consolidated entities. (It is important to remember that entity consolidation is based on information from all nodes, so this will give a better result than manually running queries on each node separately).
3. From the graphical user interface (GUI), the user selects one to many entities to find associations with.
4. The system takes the user-selected entities, parses the new consolidated primary key that was created for each one, and then sends a message to each data source to find associations for each primary key in the list which came from that source.
5. The results are collected and consolidated based on the consolidation rules for normal consolidated queries, except that the collection and consolidation in this case goes further by determining all objects at all levels of associations which are associated with the same entity.
6. The association list is updated based on the results from the previous step.
7. This new association list is returned to the GUI.

This methodology is more powerful than running an association search on each node because the system can determine that various entities are related based on information from all queried nodes. Conversely, if a single entity's associations were run based on information solely from that one data source, then additional information would be potentially missed.

For example, assume that there are two systems that are to be queried. Suppose that System 1 has entities A and B, and that System 2 has entities C and D. First, a baseline using traditional methods will be discussed: If a user's system employed traditional methods to do the queries, then the entity-results list would include: A, B, C, and D. In such a case, if the user queries for associations on A, then the user could only expect to get association set $\{A_1\}$.

However, if the example Systems 1 and 2 are queried using the methodologies of the present embodiment, then when the user runs a search, the user's system can determine that A and C are the same entity. Moreover, because of information from entity C, the user's system can further determine that B is related to A (which would not otherwise be known without the consolidation information from entity C). So the result set returned to the user contains two entities, the first of which is a combined entity from two systems: (ABC), D. If the user now queries for associations for (ABC), then the user will get association set $\{A_1, B_1, C_1\}$. Clearly, using the new methodology of the present embodiment will return more useful information to the end user, which in turn will positively affect the overall outcome of the user's search session.

User-Interface-Design Examples

Obviously, a user interface employed to help implement this embodiment can take any of many designs. The examples discussed herein are intended to provide guidance, but in no way is the present invention limited to the use of these examples.

Figures 2, 3:
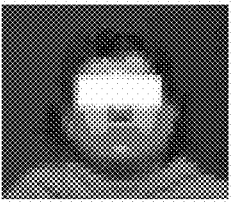
FIG. 2 depicts an example user interface of "Person" search results with a "site names" column.
FIG. 3 depicts an example user interface of a "Person" details page, with a "site names" column.

On Main query forms, the result table contains the consolidated information, plus a new column only for queries that span multiple sites. This new column contains a list of all sites where the individual pieces of information came from. FIG. 2 depicts a mock interface of "Person" search results with a "site names" column (FIG. 2: 90).

When the user chooses to view the details of a particular record (person, vehicle, etc.), the various attributes will be concatenated and an identifier of the site that they came from will also be shown. FIG. 3 depicts a mock interface of a "Person" details page, with a "site names" column (FIG. 3: 95).

Summary of the First Embodiment

This embodiment of the present invention results many advantages, including:

Entity information can be consolidated across different, physically separate, data sources.

No warehouse or consolidated pointer storage is required to perform entity consolidation.

The entity searches and organization of information is significantly quicker than migrating (ETL) all information into a warehouse or a pointer system.

Additional associations can be found based on knowledge gained from all systems.

Entity information can be consolidated without divulging personally sensitive information (SSN, Driver License, etc.) to an end-user or to intermediary computer systems, and without storing sensitive information in a centralized location.

GUI reports can be generated from systems results provided in a comma-separated column.

The detail pages of entities are a combination of all information from all data sources.

Second Embodiment

A Method of Fine-Tuning Entity Query Results

This embodiment of the present invention encompasses a method for use with first and second databases, said first database housed within a first computing system, said second database housed within a second computing system, said first and second databases geographically removed from each other, each said database having respective direct users, each said database also made available on a limited basis to users of the other of said first and second databases, each said database containing records not present in the other of said first and second databases, and with a computer-based user interface.

The method comprises the steps of: carrying out a search in each of said first and second databases, whereby each search gives rise to respective first and second search results, whereby each of said search results has a respective primary key, whereby each of said search results comprises information sharable on said limited basis with users of the other of said first and second databases, and whereby each of said search results comprises information not sharable on said limited basis with users of the other of said first and second databases; building a list of entries including said first search results and said second search results, each entry having respective content; selecting one or more entries from said list of entries and finding associations therewith; constructing a consolidated primary key comprising information from the primary key for each of said entries; making a query at each of said first and second databases using information from the content of said selected one or more entries, thereby deriving respective additional search results therefrom, whereby the respective additional search results yield at least one entry not cumulative of said first search results and said second search results; updating said list of entries to including the at least one entry not cumulative of said first search results and said second search results; and displaying said updated list of entries in a graphical user interface for a human user.

This embodiment can be further extended wherein the information from said primary key for each of said listed entries comprises encrypted or hashed information, whereby information not sharable on said limited basis is not shared with users of the other of said first and second databases.

This embodiment can be further extended wherein each entry in said list of entries results from a finding of matching information between the consolidation string of a record from said first search results and the consolidation string of a record in said second search results, whereby each consolidation string in is part of a hierarchical system representing one or more key pieces of information relating to a real-world entity stored in said respective database, whereby the information represented in each consolidation string is represented in a character format, and whereby the hierarchical ranking of consolidation string priorities are used to optimize database queries to find matching records for at least one entity of interest with substantial certainty.

This embodiment can be further extended wherein said building step, said selecting step, said constructing step, and said updating step is performed within said computer-based user interface.

This embodiment can be further extended wherein said building step, said selecting step, said constructing step, and said updating step is performed within a server separate from said computer-based user interface.

Third Embodiment

A System for Fine-Tuning Entity Query Results

This embodiment of the present invention encompasses a system for performing data queries resulting in fine entity resolution and information consolidation, comprising: first and second databases, whereby said first database housed within a first computing system; whereby said second database housed within a second computing system; whereby said first and second databases are geographically removed from each other; whereby each said of said databases have respective direct users, whereby each of said databases is also made available on a limited basis to users of the other of said first and second databases, whereby each said of databases contain records not present in the other of said first and second databases; and a computer-based user interface.

This system is configured wherein a search can be carried out in each of said first and second databases, whereby each search gives rise to respective first and second search results, whereby each of said search results has a respective primary key, whereby each of said search results comprises information sharable on said limited basis with users of the other of said first and second databases, and whereby each of said search results comprises information not sharable on said limited basis with users of the other of said first and second databases; wherein a list of entries can be built including said first search results and said second search results, each entry having respective content; wherein one or more entries can be selected from said list of entries and finding associations therewith; wherein a consolidated primary key comprising information from the primary key for each of said entries can be constructed; wherein a query can be made at each of said first and second databases using information from the content of said selected one or more entries, thereby deriving respective additional search results therefrom, whereby the respective additional search results yield at least one entry not cumulative of said first search results and said second search results; wherein said list of entries can be updated to including the at least one entry not cumulative of said first search results and said second search results; and wherein said updated list of entries can be displayed in a graphical user interface for a human user.

This embodiment can be further extended wherein the information from said primary key for each of said listed entries comprises encrypted or hashed information, whereby information not sharable on said limited basis is not shared with users of the other of said first and second databases.

This embodiment can be further extended wherein each entry in said list of entries results from a finding of matching information between the consolidation string of a record from said first search results and the consolidation string of a record in said second search results, whereby each consolidation string in is part of a hierarchical system representing one or more key pieces of information relating to a real-world entity stored in said respective database, whereby the information represented in each consolidation string is represented in a character format, and whereby the hierarchical ranking of consolidation string priorities are used to optimize database queries to find matching records for at least one entity of interest with substantial certainty.

This embodiment can be further extended wherein said building of a list of entries, said selecting of one or more entries, said constructing of consolidated primary keys, and said updating of said list of entries is performed within said computer-based user interface.

This embodiment can be further extended wherein said building of a list of entries, said selecting of one or more entries, said constructing of consolidated primary keys, and said updating of said list of entries is performed within a server separate from said computer-based user interface.

Potential Obvious Variations and Improvements

Those skilled in the art will have no difficulty devising myriad obvious variations and improvements to the invention, all of which are intended to be encompassed within the scope of the claims which follow.

The invention claimed is:

1. A method for use with first and second databases, said first database housed within a first computing system, said second database housed within a second computing system, said first and second databases geographically removed from each other, each said database having respective direct users, each said database also made available on a limited basis to users of the other of said first and second databases, each said database containing records not present in the other of said first and second databases, and with a computer-based user interface, the method comprising the steps of:
  carrying out a search in each of said first and second databases,
    whereby each search gives rise to respective first and second search results,
    whereby each of said search results has a respective primary key,
    whereby each of said search results comprises information sharable on said limited basis with users of the other of said first and second databases, and
    whereby each of said search results comprises information not sharable on said limited basis with users of the other of said first and second databases;
  building a list of entries including said first search results and said second search results, each entry having respective content;
  selecting one or more entries from said list of entries and finding associations therewith;
  constructing a consolidated primary key comprising information from the primary key for each of said entries;
  making a query at each of said first and second databases using information from the content of said selected one or more entries,
    thereby deriving respective additional search results therefrom,
    whereby the respective additional search results yield at least one entry not cumulative of said first search results and said second search results;
  updating said list of entries to including the at least one entry not cumulative of said first search results and said second search results; and
  displaying said updated list of entries in a graphical user interface for a human user.

2. The method of claim 1 wherein the information from said primary key for each of said listed entries comprises encrypted or hashed information, whereby information not sharable on said limited basis is not shared with users of the other of said first and second databases.

3. The method of claim 1 wherein each entry in said list of entries results from a finding of matching information between the consolidation string of a record from said first search results and the consolidation string of a record in said second search results,
  whereby each consolidation string in is part of a hierarchical system representing one or more key pieces of information relating to a real-world entity stored in said respective database,
  whereby the information represented in each consolidation string is represented in a character format, and
  whereby the hierarchical ranking of consolidation string priorities are used to optimize database queries to find matching records for at least one entity of interest with substantial certainty.

4. The method of claim 1, wherein said building step, said selecting step, said constructing step, and said updating step is performed within said computer-based user interface.

5. The method of claim 1, wherein said building step, said selecting step, said constructing step, and said updating step is performed within a server separate from said computer-based user interface.

6. A system for performing data queries resulting in fine entity resolution and information consolidation, comprising:
  first and second databases,
    whereby said first database housed within a first computing system;
    whereby said second database housed within a second computing system;
    whereby said first and second databases are geographically removed from each other;
    whereby each said of said databases have respective direct users,
    whereby each of said databases is also made available on a limited basis to users of the other of said first and second databases,
    whereby each said of databases contain records not present in the other of said first and second databases;
  a computer-based user interface;
  wherein a search can be carried out in each of said first and second databases,
    whereby each search gives rise to respective first and second search results,
    whereby each of said search results has a respective primary key,
    whereby each of said search results comprises information sharable on said limited basis with users of the other of said first and second databases, and
    whereby each of said search results comprises information not sharable on said limited basis with users of the other of said first and second databases;
  wherein a list of entries can be built including said first search results and said second search results, each entry having respective content;
  wherein one or more entries can be selected from said list of entries and finding associations therewith;
  wherein a consolidated primary key comprising information from the primary key for each of said entries can be constructed;
  wherein a query can be made at each of said first and second databases using information from the content of said selected one or more entries,
    thereby deriving respective additional search results therefrom,
    whereby the respective additional search results yield at least one entry not cumulative of said first search results and said second search results;

wherein said list of entries can be updated to including the at least one entry not cumulative of said first search results and said second search results; and wherein said updated list of entries can be displayed in a graphical user interface for a human user.

7. The system of claim 6 wherein the information from said primary key for each of said listed entries comprises encrypted or hashed information, whereby information not sharable on said limited basis is not shared with users of the other of said first and second databases.

8. The system of claim 6 wherein each entry in said list of entries results from a finding of matching information between the consolidation string of a record from said first search results and the consolidation string of a record in said second search results, whereby each consolidation string in is part of a hierarchical system representing one or more key pieces of information relating to a real-world entity stored in said respective database, whereby the information represented in each consolidation string is represented in a character format, and whereby the hierarchical ranking of consolidation string priorities are used to optimize database queries to find matching records for at least one entity of interest with substantial certainty.

9. The system of claim 6, wherein said building of a list of entries, said selecting of one or more entries, said constructing of consolidated primary keys, and said updating of said list of entries is performed within said computer-based user interface.

10. The system of claim 6, wherein said building of a list of entries, said selecting of one or more entries, said constructing of consolidated primary keys, and said updating of said list of entries is performed within a server separate from said computer-based user interface.

* * * * *